United States Patent [19]
Phelan

[11] Patent Number: 5,628,897
[45] Date of Patent: May 13, 1997

[54] HEATED FILTER CHAMBER WITH SUPPORTING COLLECTION CHAMBER

[76] Inventor: John J. Phelan, 109 Jeanette Ave., Inwood, N.Y. 11696

[21] Appl. No.: 505,676

[22] Filed: Jul. 21, 1995

[51] Int. Cl.$^6$ .................................................. B01D 35/18
[52] U.S. Cl. .................... 210/94; 210/149; 210/184; 210/261; 210/451; 210/473
[58] Field of Search .................................. 210/149, 180, 210/184, 186, 187, 257.1, 261, 263, 264, 265, 266, 282, 473, 474, 743, 94, 451, 477, 483, 492.01; 202/83, 176; 203/10; 137/468

[56] References Cited

U.S. PATENT DOCUMENTS

| | | | |
|---|---|---|---|
| 3,756,220 | 9/1973 | Tehrani | 126/350 |
| 4,867,875 | 9/1989 | Peranio | 210/474 |
| 4,948,499 | 8/1990 | Peranio | 210/266 |
| 4,957,624 | 9/1990 | Peranio | 210/184 |
| 4,978,458 | 12/1990 | Inagaki et al. | 210/748 |
| 5,068,030 | 11/1991 | Chen | 210/95 |
| 5,139,676 | 8/1992 | Ebisawa et al. | 210/651 |
| 5,225,076 | 7/1993 | Meredith | 210/181 |
| 5,348,623 | 9/1994 | Salmon | 203/10 |

*Primary Examiner*—Joseph W. Drodge
*Attorney, Agent, or Firm*—Richard L. Miller, P.E.

[57] ABSTRACT

A water pacifier that includes a hollow and rectangular parallelpipedly-shaped collection chamber, a hollow, vertically oriented and cylindrically-shaped purifying chamber, a circular-shaped filter, an electric heater coil, and a bimetallic strip. The collection chamber collects purified water. The purifying chamber purifies water to be collected in the collection chamber. The filter filters the water being purified in the purifying chamber. The electric heater coil boils the water filtered by the filter. Also, the bimetallic strip selectively opens and closes a centrally-disposed throughbore in a flat and horizontally-oriented bottom of the purifying chamber in response to the temperature of the purified water it is in contact with, so that when the water boiled by the heater coil reaches 210 degrees F., the bimetallic strip bends away from and opens the centrally-disposed throughbore in the flat and horizontally-oriented bottom of the purifying chamber allowing the purified water to be directed into the collection chamber.

6 Claims, 1 Drawing Sheet

U.S. Patent
May 13, 1997
5,628,897
FIG. 1
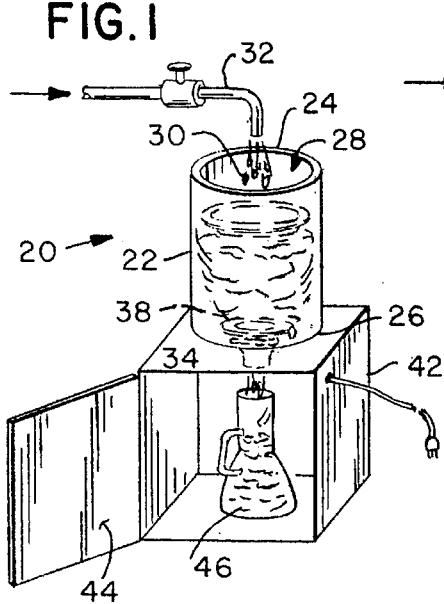
FIG. 2
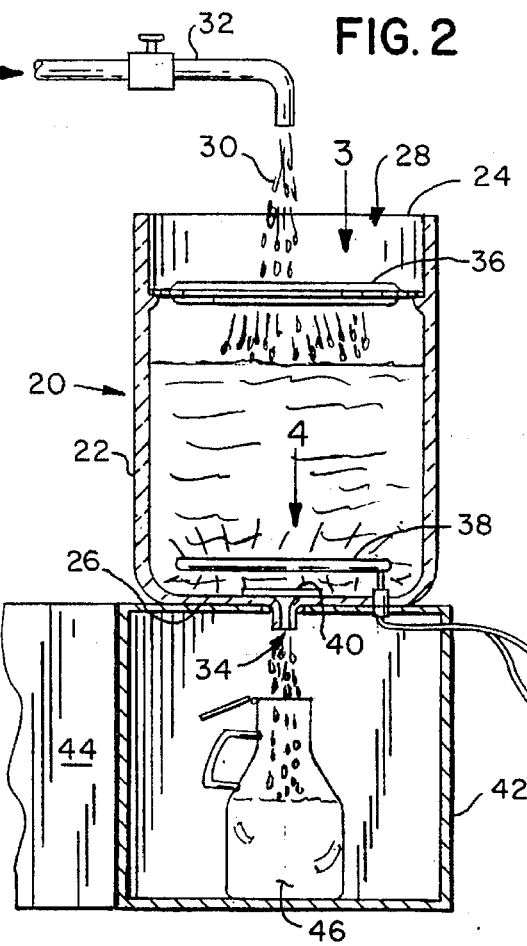
FIG. 3
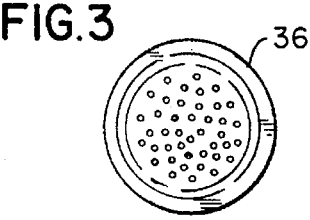
FIG. 4
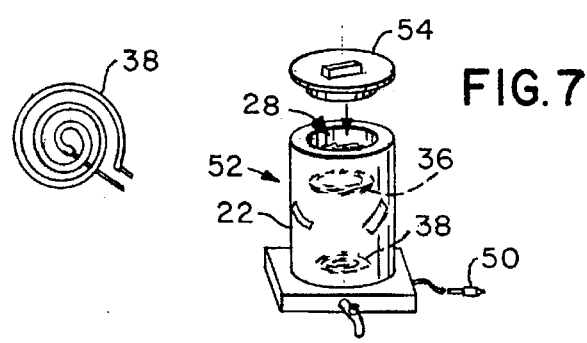
FIG. 7
FIG. 6
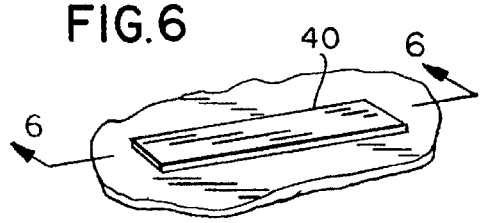
FIG. 5
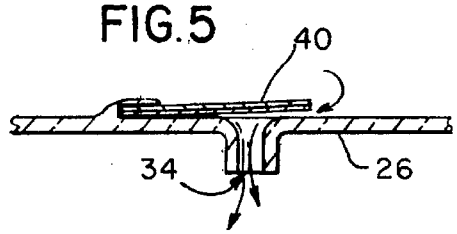

HEATED FILTER CHAMBER WITH SUPPORTING COLLECTION CHAMBER

BACKGROUND OF THE INVENTION

The instant invention relates to purified water and an apparatus for producing the same. More specifically the instant invention relates to a novel apparatus for filtering and boiling water to remove chlorine and other impurities and to kill any microbes passing through the filter.

DESCRIPTION OF RELATED ART

Water quality has been deteriorating due to pollution as industries have developed. Water in rivers or lakes has gradually been polluted by waste material, especially by toxic metals or chemicals, coming from chemical or metal treatment factories. Although the tap water used by home owners is purified by several processes, such as settling, filtering, disinfecting, chlorinating, and the like, it may still contain bacteria so that it is unsuitable for drinking without boiling. Additionally, bacteria, miscellaneous impurities and chlorides may be consumed with raw vegetables which have been washed in contaminated tap water. Tap water is considered to have the following disadvantages:

1. It still contains considerable amounts of micro bacteria and miscellaneous impurities, thus rendering it not suitable for washing raw vegetables or fruit.
2. It contains some chlorides, so it can detrimentally affect the health of people who eat vegetables cooked with it.

Numerous types of water purification devices have previously been designed for purifying water. For example, Tehrani, et al U.S. Pat. No. 3,756,220 discloses an apparatus for injecting the combustion products from a gas heater into a stream of water being circulated in a system such as the purifying circuit of a water reservoir. This effects a controlled mild acidifying effect which maintains the water at a selected pH level for maintaining it in a purified condition, eliminating the need for muriatic acid and reducing the requirement for chlorine additives commonly used in purifying the water of a pool. Application of suction to the heater's combustion chamber above its burner greatly increases heater efficiency. Unfortunately due to releasing the products of combustion into the water, this apparatus does not produce water suitable for drinking.

Inagaki U.S. Pat. No. 4,978,458 discloses a method of purifying water by processing raw water with a high density light beam obtained by condensing solar light to obtain drinking water, and the apparatus to be used in carrying out this method. The apparatus comprises a light condenser for condensing solar light to obtain a high density light beam and a heat-resistant glass tube having a transparent section for passing original water through a portion corresponding to a focal point of the light condenser. This apparatus requires exposure to sunlight to effect water purification and therefore is not suitable for in door use.

Chen U.S. Pat. No. 5,068,030 discloses a water filtering, sterilizing and heating apparatus. The apparatus includes a filter tank provided with activated carbon therein, to filter bacteria, miscellaneous impurities and odor in water. The output of the filter is coupled to a microwave oscillator to vibrate and churn the water coming from the filter tank. The water from the microwave oscillator is coupled to an ultraviolet light sterilizing tank having an ultraviolet lamp disposed vertically in the center thereof. A storage tank is provided to receive and store the water coming from the ultraviolet light sterilizing tank. The fluid level in the storage tank in maintained by automatically controlling the passage of water thereto by means of an electromagnetic valve actuated by a micro switch responsive to displacement of a float. Unfortunately, there is concern with devices of this type that only the water in the immediate vicinity of the ultraviolet lamp is sterilized and if the water is in the sterilization tank for too short a time, some portions of the water in the tank will not be fully sterilized.

Ebisawa, et al U.S. Pat. No. 5,139,676 discloses a method of producing bacteriostatic water and is characterized by the steps: a) heating unprocessed water to produce primary water; b) filtering the primary water in order to remove bacteria and dust to produce secondary water; and c) exposing the secondary water to oxygen gas to produce bacteriostatic water. In this invention, oxygen gas is used not only as a biostatic treating agent, but also as an aerosol propellant. Due to the requirement for oxygen gas to effectuate this process, it would not be suitable for household use.

Meredith U.S. Pat. No. 5,225,076 discloses a purified coffee and ice water dispenser to replace the standard kitchen sink taps. The tap water is directed to a flow director at the base of the spout which adjusts to allow the flow to either run through a water filter or through the spout directly into the sink. When the tap water is directed through the water filter, it fills a pre-heated water reservoir depending on the direction the spout is moved, and is drawn by opening the hot water or cold water spout. Coffee is drawn by adjusting a regulator valve which sends the hot water through a coffee filter and out the hot water spout. The reservoirs are cooled and heated electrically with thermostats. This apparatus merely produces filtered water and neither boils nor sterilizes the water. Thus bacteria are not destroyed. Thus the need for a more bacteriostatic water is not being met.

None of these inventions discloses a low cost method of producing a high quality bacteriostatic water in which tap water is filtered and fully boiled before entering a storage tank.

SUMMARY OF INVENTION, OBJECTS AND ADVANTAGES

It is therefore an object of the present invention to provide an economical apparatus for the purification of tap water.

Yet another object of this invention is to provide an apparatus which first filters the water to remove chlorine and other impurities and then boils the water to kill bacteria and other microbes.

Still another object of this invention is to provide an apparatus which collects the purified water after it has been filtered and boiled.

A further object of this invention is to provide a portable purification unit which can be operated on either 110 volts AC or 12 volts DC.

Further scope of applicability of the present invention will become apparent from the detailed description given hereinafter. 16 However, it should be understood that the drawings and the detailed description, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a diagrmmatic perspective view of the instant invention.

FIG. 2 is an enlarged diagrammatic elevational view partially sectioned illustrating the filter component, heating element dispensing unit provisioned for use with both 110 volts AC or 12 volts DC.

FIG. 3 is a diagrammatic plan view taken in the direction of arrow 3 in FIG. 2 of the filter component.

FIG. 4 is a diagrammatic plan view taken in the direction of arrow 4 in FIG. 2 of a typical heating element.

FIG. 5 is an enlarged diagrammatic perspective view illustrating the temperature sensitive valve in greater detail.

FIG. 6 is a cross sectional view taken on line 6—6 of FIG. 5 with the valve open.

FIG. 7 is a diagrammatic perspective view of a portable embodiment of the instant invention.

DESCRIPTION OF PREFERRED EMBODIMENT

Turning now descriptively to the drawings, in which similar reference characters denote similar elements throughout the several views, the water purification apparatus is generally shown as numeral 20 in FIG. 1. The water purification apparatus consists of a purification chamber 22 having a top 24 and a bottom 26. The purification chamber 22 is cylindrical in shape. Thus the side 22 of the purification chamber 22 is rounded and is preferably made of a see-through material typically glass so that the water level below the activated carbon filter 36 can be viewed. The purification chamber 22 has an opening 28 at its top 24 for the reception of the water 30 to be purified. The bottom 26 of the purification chamber 22 has a hole 34 centrally located therein for allowing the purified water to exit the purification chamber 22. The purification chamber 22 has a filter mechanism which utilizes an activated carbon filter 36 mounted therein for filtering the water 30 which enters the opening 28 in the top of the purification chamber 22. Beneath the activated carbon filter 36 near the bottom 26 of the purification chamber 22, a heating arrangement which utilizes an electric heater coil 38 is mounted for boiling the water which passes through the activated carbon filter 36. Underneath the heater coil 38 and covering the centrally located hole 34 in the bottom of the purification chamber is a temperature sensitive valve which utilizes a bimetallic strip 40. The bimetallic strip 40 is responsive to the temperature of the heated water which contacts it. The bimetallic strip 40 is selected to have the characteristic that when the water in contact with it reaches about 210 degrees F., the bimetallic strip 40 bends sufficiently away from the centrally located hole 34 in the bottom of the purification chamber to allow the heated water to pass through the centrally located hole 34 and into the collection chamber 42.

The collection chamber 42 is removably attached to the bottom of the purification chamber 22 and receives the filtered and heated water which passes through the central hole 34 in the bottom 26 of the purification chamber 42.

The collection chamber 42 has a door 44 in the side thereof for the insertion of a pitcher for receiving the purified water which enters the collection chamber.

As is best seen in FIG. 2, the heating element 38 is electrically equipped with both a 110 volts A.C. plug 48 and a 12 volts D.C. plug 50 so that the unit can be powered by either household current or vehicle current.

FIG. 3 is an enlarged view of the activated carbon filter 36. As shown in FIG. 2, the activated carbon filter 36 can be removed from the purification chamber 22 and replaced when its filtering effect has been exhausted.

FIG. 4 is an enlarged view of the electric heater coil 38.

FIGS. 5 and 6 illustrate the bimetallic strip 40 in greater detail.

FIG. 5 shows the bimetallic strip 40 bending away from the opening 34 in the bottom 26 of the purification chamber 22 in response to heat thus providing egress for the heated water.

FIG. 7 illustrates a portable embodiment 52 of the instant invention. The portable embodiment 52 is shown with the cap 54 being placed over its opening 28. As is shown, the portable embodiment does not have a collection chamber and is powered by 12 volts D.C.

LIST OF REFERENCE NUMBERS 20 water purification apparatus
22 purification chamber
24 top of water purification apparatus
26 bottom of water purification apparatus
28 opening in top
30 tap water
32 faucet
34 hole centrally located in bottom of purification chamber
36 activated carbon filter
38 electric heater coil
40 bimetallic strip
42 collection chamber
44 door in side of collection chamber
46 pitcher
48 plug for electrically connecting electric heater coil to 110 volts AC house electricity
50 plug for electrically connecting electric heater coil to 12 volts DC electricity
52 a portable embodiment of the instant invention
54 cap for the portable embodiment

CONCLUSION, RAMIFICATIONS, AND SCOPE OF INVENTION

From the foregoing, it will be seen that I have provided is an economical water purification apparatus which filters water to remove chlorine and other contaminants and boils the water to kill microbes.

Thus the reader will see that my invention supplies a long felt need for water purification apparatus which is economical to make and use and which destroys any microbes which pass through the activated carbon filter. There are many variations of this water purification apparatus which can be made by those skilled in the art without departing from the inventive concepts expressed herein. Accordingly, the scope of my invention should be determined not by the embodiments described, but by the appended claims and their legal equivalents.

The invention claimed is:

1. A water purifier, comprising:

a) a hollow and rectangular parallelpipedly collection chamber for collecting purified water having a temperature; said hollow collection chamber having a flat and horizontally-oriented top with a centrally-disposed throughbore extending vertically therethrough having a diameter; said hollow collection chamber further having a flat, closed, and horizontally-oriented bottom, so that said hollow collection chamber can rest stably on a surface;

b) a hollow, vertically-oriented, and cylindrically-shaped purifying chamber for purifying water to be collected in said hollow collection chamber and having a cylindrically-shaped inner surface and an open top; said hollow, vertically-oriented, and cylindrically-shaped purifying chamber further having a circumferential ledge extending circumferentially around said cylindrically-shaped inner surface of said hollow, vertically-oriented, and cylindrically-shaped purifying chamber in proximity to said open top of said hollow, vertically-oriented, and cylindrically-shaped purifying chamber; said hollow, vertically-oriented, and cylindrically-shaped purifying chamber further having a flat and horizontally-oriented bottom with a diameter, an inner surface, and a centrally disposed throughbore extending vertically therethrough having a perimeter; said hollow, vertically-oriented, and cylindrically-shaped purifying chamber further having a hollow and cylindrically-shaped collar for directing the purified water purified in said hollow, vertically-oriented, and cylindrically-shaped purifying chamber to said hollow and collection chamber and extending vertically downwardly from said perimeter of said centrally disposed throughbore in said flat and horizontally-oriented bottom of said hollow, vertically-oriented, and cylindrically-shaped purifying chamber; said hollow and cylindrically-shaped collar of said hollow and collection chamber having an outer diameter which is small compared to said diameter of said flat and horizontally-oriented bottom of said hollow, vertically-oriented, and cylindrically-shaped purifying chamber and being substantially equal to said diameter of said centrally disposed throughbore in said flat and horizontally-oriented top of said hollow collection chamber; said flat and horizontally-oriented bottom of said hollow, vertically-oriented, and cylindrically-shaped purifying chamber abutting replaceably and completely against said flat and horizontally-oriented top of said hollow collection chamber with said hollow and cylindrically-shaped collar of said hollow, vertically-oriented, and cylindrically-shaped purifying chamber extending vertically downwardly into said centrally-disposed throughbore in said flat and horizontally-oriented top of said hollow collection chamber, so that said hollow, vertically-oriented, and cylindrically-shaped purifying chamber rests stably on said flat and horizontally-oriented top of said hollow collection chamber;

c) a circular-shaped filter for filtering the water being purified in said hollow, vertically-oriented, and cylindrically-shaped purifying chamber and being removably mounted on said circumferential ledge of said hollow, vertically-oriented, and cylindrically-shaped purifying chamber, so that said circular-shaped filter can be readily removed and replaced through said open top of said hollow, vertically-oriented, and cylindrically-shaped purifying chamber when its filtering effects have been exhausted;

d) an electric heater coil for boiling the water filtered by said circular-shaped filter and being mounted in said hollow, vertically-oriented, and cylindrically-shaped purifying chamber, below and separate from said circular-shaped filter, and slightly above said flat and horizontally-oriented bottom of said hollow, vertically-oriented, and cylindrically-shaped purifying chamber; said electric heater coil being powered by one of 110 volts A.C. or 12 volts D.C., so that said heating coil can be powered by one of household current and vehicle current; and e) a bimetallic strip attached to said inner surface of said flat and horizontally-oriented bottom of said hollow, vertically-oriented, and cylindrically-shaped purifying chamber and selectively opening and closing said centrally-disposed throughbore in said flat and horizontally-oriented bottom of said hollow, vertically-oriented, and cylindrically-shaped purifying chamber in response to the temperature of the purified water it is in contact with and having the characteristic of bending at 210 degrees F., so that when the water boiled by said circular-shaped heater coil reaches 210 degrees F., said bimetallic strip bends away from and opens said centrally-disposed throughbore said flat in and horizontally-oriented bottom of said hollow, vertically-oriented, and cylindrically-shaped purifying chamber allowing the purified water to enter said cylindrically-shaped collar of said hollow, vertically-oriented, and cylindrically-shaped purifying chamber and be directed thereby into said hollow collection chamber.

2. The purifier as defined in claim 1, wherein said hollow collection chamber contains a pitcher for collecting the purified water that is accessible from a door in a vertical wall of said hollow collection chamber.

3. The purifier as defined in claim 1, wherein said hollow, vertically-oriented, and cylindrically-shaped purifying chamber is transparent, so that the water therein can be viewed and maintained below the circular-shaped filter.

4. The purifier as defined in claim 3, wherein said transparent hollow, vertically-oriented, and cylindrically-shaped purifying chamber is glass.

5. The purifier as defined in claim 1, wherein said circular-shaped filter is an activated carbon filter.

6. The purifier as defined in claim 1, wherein said electric heater coil is provided with both a 110 volt A.C. plug and a 12 volt D.C. plug, so that said electric heater coil can be powered by one of 110 volt A.C. and 12 volt D.C.

* * * * *